Sept. 28, 1943. J. A. COVER 2,330,408
FERTILIZATION OF SMALL PLANTS
Filed Sept. 7, 1942
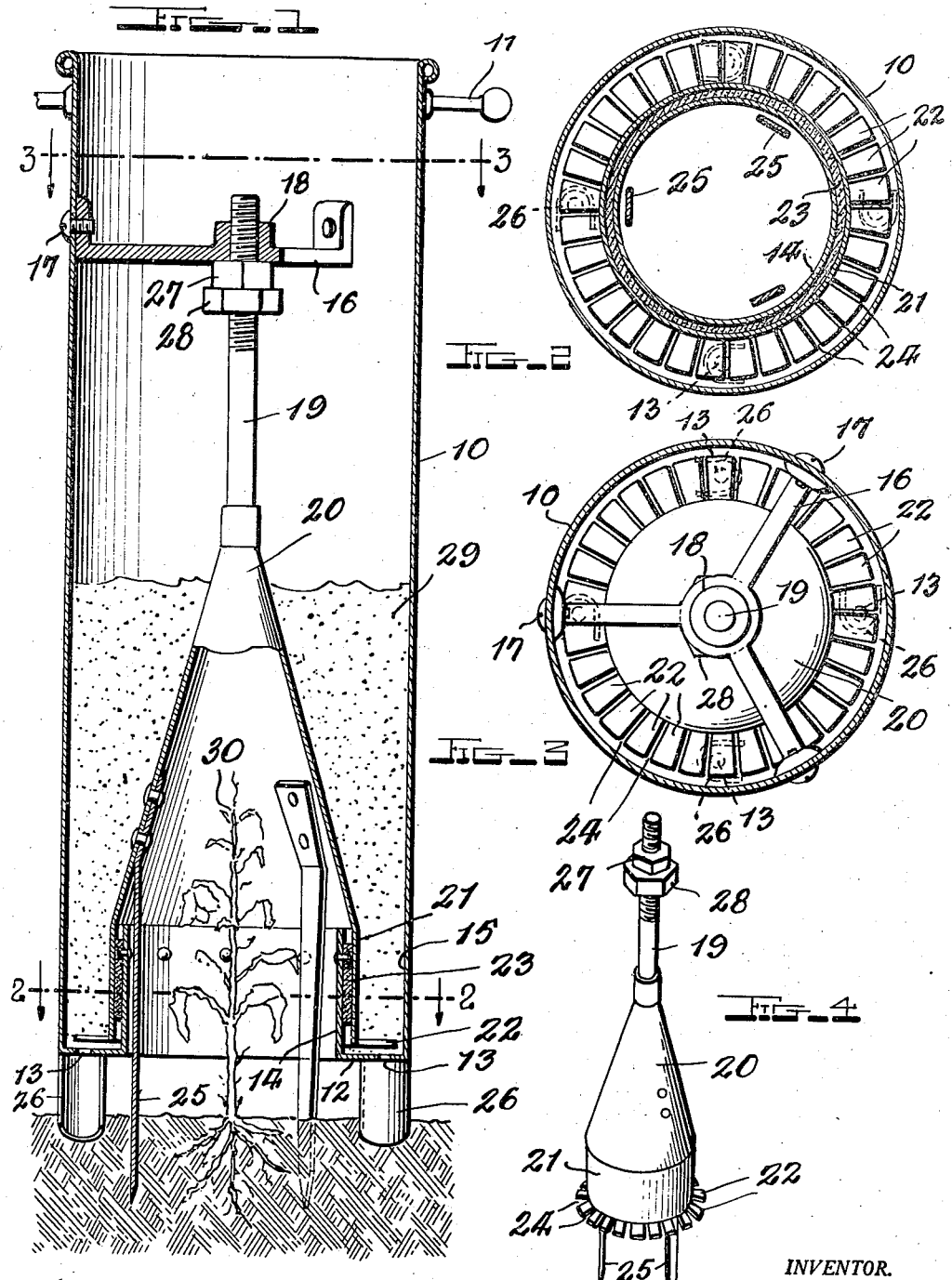
INVENTOR.
JACOB AUSTIN COVER,
BY
Christian R. Nelsen
ATTORNEY Patented Sept. 28, 1943

2,330,408

UNITED STATES PATENT OFFICE 2,330,408

FERTILIZATION OF SMALL PLANTS

Jacob Austin Cover, Modesto, Calif.

Application September 7, 1942, Serial No. 457,562

6 Claims. (Cl. 111—1)

The invention relates to means for applying fertilizer around plants which have been set, in such manner that the fertilizer will not be deposited upon the set plant, so closely to the roots thereof as to injure the same, which is undesirable in connection with most fertilizers, because in their concentrated form they will damage the upper parts of the plants if contacted therewith, or may injure the plant by leaching of concentrated solutions from rain if the fertilizer is deposited too closely to the roots.

The invention is especially useful in enabling the fertilization of small plants, such as tomato plants, cabbage, or other plants, as may be found required. The invention is adapted to be used in connection with any automatic planting machinery, although in the present instance, it is embodied as a hand instrument adapted to be operated over plants already set, whether by machinery or otherwise, and it is an important aim of the invention to embody it in a light construction adapted to be readily operated by hand, with accuracy and efficiency.

The invention is of value in enabling the control of insects and plant diseases by enabling the deposit of fertilizers safely in close relation to the plants which by their nature will kill or discourage insects or fungus growth, and in case the fertilizer alone is not so operative, it will enable the admixture of insecticide and fungus controlling materials with a fertilizer so as to operate either by contact or production of fumes, or the invention may enable the deposit of insecticide and fungicide as a separate operation in plant protection and control.

It is a special aim of the invention to present a novel construction of such an appliance which enable the deposit and covering of fertilizer in the soil, by one operation, so that the advantages of a drill are obtained.

It is also an important aim of my invention to embody in a form and structure which may be operated with a minimum of effort, and with a minimum liability of faulty operation. It is also a purpose to present the invention in a structure which will be extremely durable and liable in a minimum degree to derangement of adjustment or functional relation of the parts, as well as being rugged and subject to a minimum of wear or liability of breakage. It is a still further aim to present such a device which may be adjusted to vary the proportion or quantity of fertilizer deposited at each operation in an extremely simple manner and with great certainty.

A further purpose of the invention is to embody the invention in a form which may be readily understood, operated and adjusted by the average farm-hand, and which may be readily taken apart for cleaning or repair, without requiring expert mechanical training.

Additional objects, advantages and features of invention reside in the construction, arrangement and combination of parts involved in the embodiment of the invention, as will be more readily understood from the following description and accompanying drawing, wherein Figure 1 is a vertical sectional view of a hand drill device embodying my invention, showing it applied to use around and over a small plant, and engaged with the earth around the plant.

Figure 2 is a horizontal sectional view on the line 2—2 of Figure 1, looking downward;

Figure 3 is a section on the line 3—3 of Figure 1, looking downward.

Figure 4 is a perspective view of the tripod or canopy element of the device, detached.

There is illustrated a hand drill device comprising a cylindrical receptacle and casing body 10, which may be formed of thin steel sheet metal or stock tubing, and for use upon bigger plants, may be approximately eight inches in diameter, more or less, and for use upon other plants may be larger or smaller, according to the size of the plants. This receptacle is provided with handles 11 at opposite sides, at its upper part, and the length of the cylindrical portion of the receptacle may be such that it may be conveniently operated by a person grasping the handles in respective hands and operating the device by setting it upon soil while standing closely adjacent the plant to be fertilized, or otherwise treated. At its lower end, the receptacle is formed with an annular bottom 12, having an annular series of apertures 13 formed therethrough close to the outer wall of the receptacle and arranged concentrically with respect thereto. At the inner edge of the bottom 12, an upstanding cylindrical wall 14 is formed, spaced from the outer wall of the receptacle 10 but a short distance, so that an annular channel 15 is formed in the lower end of the receptacle, and an opening of substantial size is provided, extending through and within the wall portion 14. The wall 14 need be only three inches, more or less, in height, although this may be varied as discretion dictates, and the total height of the receptacle 10 may be such as to permit grasping of the handles without requiring the operator to stoop unduly.

In the upper part of the receptacle 10, a spider frame 16 is mounted, including radial arms which are secured to the wall of the receptacle 10 by means of screws, as at 17, and including at its center an interiorly threaded bearing 18 in which there is screwed and revoluble a shaft 19 having its upper portion threaded for a suitable distance above and below the bearing 18 and having fixed upon its lower end a metal or other rigid cone or canopy 20, the base of which terminates just outwardly of the cylindrical wall 14 on the bottom of the receptacle, and is continued beside the wall 14 with a cylindrical wall portion 21 spaced very close to and in revoluble relation to the wall 14. The lower edge portion of the material of the wall 21 is segmented and bent outwardly at right angles, so as to form a multiplicity of small wings 22, lying horizontally in a close relation to the bottom 12 of the receptacle, and stopping short of the outer wall of the receptacle, these wings functioning as agitators and closures for the apertures 13, at one position of the cone in relation to the receptacle 10, as will be explained. The depth of the wall portion 21 is such in relation to the wall 14 that the cone may move downwardly into the receptacle so that the wings 22 may lie closely upon the bottom 12, and at this position, preferably, the wings and apertures 13 are so spaced that each aperture is covered by a respective wing. This will enable the drill as a whole to be carried from place to place with a minimum of waste or spillage of fertilizer or other materials or chemicals to be applied. In the present instance, there are shown but four of the apertures 13, although the number may be varied, as found desirable and expedient. If desired, a packing 23 may be loosely engaged between the walls 14 and 21, such as felt, attached to one of the walls. Secured upon the canopy 20 above the wall 14 located within the canopy, there are a number of anchor spades 25, extending downwardly in close spaced relation to the wall 14 on the bottom of the receptacle, and being sharply pointed so as to readily enter soil below the device, being extended several inches below the bottom 12 of the receptacle for this purpose. Three of these spades are shown in the present instance. Upon the bottom 12 of the receptacle and extending downwardly and exteriorly therefrom, there are provided adjacent each of the apertures 13 respective drill shoes 26, substantially U-shaped in horizontal section and secured to the bottom 12 rigidly, partly surrounding respective openings or ports 13. The open sides of these shoes are directed in a counter-clockwise direction, around the axis of the receptacle 10, for a purpose which will be subsequently explained. The lower ends of the shoes are shaped in a manner to correspond to the lower ends of drill spouts and the like, so as to form a drill in the earth when extended a short distance thereinto and rotated in a clockwise direction, as will be understood. The walls of the drill shoe are spaced a short distance from the respective openings, so as to afford ample clearance for the fall of material into the drill formed by the shoes as they are moved in a manner to be described.

On the threaded portion of the shaft 19 below the spider 15, a lock nut 27 is engaged upon the shaft, and below that, a lock nut 28, to hold the nut 27 in adjusted positions. The shaft 19 is freely revoluble in the threaded bearing 18, as will be understood, and by reason of its threaded engagement in the bearing, the canopy 20 is supported within the receptacle 10 properly.

It will be apparent that the relative rotation of the receptacle 10 in a clockwise direction with relation to the canopy 20 will result in the bearing 18 moving downwardly upon the shaft 19 until stopped by the nut 27, as shown in Figure 1. The nut is so adjusted that at this stop position, the wings 22 will be spaced a short distance above the bottom 12, so as to afford a clearance for the passage of granular or pulverulent material 29 within the container around the canopy, as will be readily understood. The wings 22 are spaced apart so as to afford slots 24 therebetween, the width of which is properly proportioned to allow the material 29 to move downwardly therethrough when the wings are moved horizontally over the bottom 12, as will occur when the canopy is held stationary and the receptacle 10 rotates.

Counter-clockwise movement of the receptacle 10 with respect to the canopy will be limited by engagement of the wings 22 against the floor 12, or against materials under the wings and over the floor, as will be understood.

In the use of the appliance, suitable fertilizer, or a mixture of fertilizer and insecticide, or a quantity of insecticide, either granulated or pulverized, is introduced into the receptacle 10, as shown at 29, and the plant to be fertilized or otherwise treated having been set in the soil, the operator grasps the handles 11 in respective hands and lifts the drill into position centered over the plant 30, to be fertilized or otherwise treated, and then lowers the whole device around the plant, so that the latter sets within the chamber or space formed under the canopy 20, and the spades enter into the soil a distance and spaced outwardly from the plant, as shown in Figure 1. The drill shoes 26 are also pressed a short distance into the soil, as illustrated in Figure 1. Preliminary to this positioning of the drill, the receptacle 10 and canopy are located relatively, so that the canopy is at its lower position with the wings 20 close over the openings 13, and the device having been positioned as described, the receptacle 10 is now located so that it is screwed downwardly upon the shaft 19, the spurs 25 locking the canopy 20 and shaft against rotation. In this clockwise rotation of the receptacle 10, the shoes 26 describe respective arcs concentric with the stalk of the plant 30, and the mass of the material 29 being moved with the receptacle relatively to the canopy and wings 22, the latter move through the material 29 with a slicing and agitating action, causing the material to slip through the slots 24 and to be pushed to the openings 13, through which it drops into the drill formed by the rotation of the shoes 26 in engagement with the soil, as shown. Preferably, the adjustment of the nuts 27 and 28 is such as to permit a full quarter turn of the receptacle 10 in this operation, where four of the openings 13 only are provided, a lesser movement may be found sufficient. As the shoes 26 move in the soil, the soil is first pressed to each side of the shoe beside the drill, and the material 29 passing to the openings 13 falls into the bottom of the drill while the earth is so pressed aside. After passage of the shoes beyond the part at which the material 29 is deposited, the earth falls back in part and so covers the material to some extent. The receptacle 10 may next be rotated counter-clockwise, so as to return the parts to initial position with the wings 20 in position to prevent further distributing of the material 29 from the receptacle with the shoe still engaged in the top soil, in which event there will be a stirring and admixture of the previously dropped material and also that dropping during the counter-clockwise movement, with the soil. If desired, however, the device may be lifted before the counter-clockwise movement so that the shoe 26 clears the soil but the spades 25 still remains engaged therein, and then the first deposited material 29 will remain covered, while that which escaped during the counter-clockwise movement and which would be in a lesser quantity, will simply be deposited upon the surface of the soil.

While I have describe 1 and illustrated my invention with great particularity in the best embodiment known to me at this time, it will, nevertheless, be understood that this is purely exemplary, and that modifications and changes in construction, arrangement and combination of parts may be made within the limits of the appended claims, without departing from the spirit of the invention.

By the adjustment of the nuts 27 and 28 to permit a greater extent of relative rotation of the receptacle 10 relatively to the canopy and wings 22, corresponding increase in the quantity of the material 29 discharged through the openings 32 may be attained. The quantity may also be increased by increasing the number of the openings 13, if found desirable.

I claim:

1. A drill device for the purposes described comprising a receptacle having an outer wall and having a bottom formed with a central opening therethrough and an upstanding inner wall around said opening spaced from said outer wall, said bottom having a plurality of openings therethrough, and a canopy element set within the receptacle and having a base wall overlying the said inner wall, ground-engaging anchor spades fixed on the canopy and extending downwardly clear of the receptacle, means to support the receptacle for free rotation relatively to the canopy, agitator means carried by the canopy adjacent said openings for the purposes described, and means to position the device around a plant and to rotate the receptacle.

2. The structure of claim 1 in which drill shoes are mounted on the bottom of the receptacle for engagement with soil below said openings.

3. The structure of claim 1 in which said canopy is provided with a segmented agitator means movable closely over said openings.

4. The structure of claim 1 in which said canopy is provided with a plurality of lateral wing members at its lower part and means to stop relative rotation of the receptacle and canopy in one direction with a respective wing over and in closure relation to each said opening.

5. The structure of claim 1 in which said canopy is provided with a plurality of lateral wing members at its lower part close to said bottom and arranged so that at initial position of the canopy and receptacle a respective wing will be over each opening, said canopy having a screw-threaded shaft extended upwardly concentrically therefrom within the receptacle, a screw-threaded bearing fixed to the receptacle and engaged with the shaft, the threads being pitched so that under relative rotation of the receptacle from initial position in operative direction the shaft, canopy and wings will be raised relative to the receptacle.

6. The structure of claim 1 in which said canopy is provided with a plurality of lateral wing members at its lower part close to said bottom and arranged so that at initial position of the canopy and receptacle a respective wing will be over each opening, said canopy having a screw-threaded shaft extended upwardly concentrically therefrom within the receptacle, a screw-threaded bearing fixed to the receptacle and engaged with the shaft, the threads being pitched so that under relative rotation of the receptacle from initial position in operative direction the shaft, canopy and wings will be raised relative to the receptacle, and means adjustably fixed on the shaft to limit relative rotation and upward movement thereof in the said bearing.

JACOB AUSTIN COVER.